United States Patent

Nanamoto et al.

Patent Number: 5,814,108
Date of Patent: Sep. 29, 1998

[54] METHOD FOR MANUFACTURING NICKEL-METAL-HYDRIDE BATTERY

[75] Inventors: Katsuya Nanamoto; Yuichi Umehara, both of Kyoto, Japan

[73] Assignee: Japan Storage Battery Co., Ltd., Kyoto, Japan

[21] Appl. No.: 512,414

[22] Filed: Aug. 8, 1995

[30] Foreign Application Priority Data

Aug. 9, 1994 [JP] Japan .................................. 6-209093
Aug. 11, 1994 [JP] Japan .................................. 6-212039

[51] Int. Cl.$^6$ .................................................. H01M 10/30
[52] U.S. Cl. ........................ 29/623.1; 29/623.2; 429/206; 429/223
[58] Field of Search ...................... 429/226, 206, 429/223; 29/623.1, 623.5

[56] References Cited

U.S. PATENT DOCUMENTS

| | | | |
|---|---|---|---|
| 3,899,351 | 8/1975 | Maurer et al. | 429/206 |
| 5,131,920 | 7/1992 | Moriwaki et al. | 29/623.2 |
| 5,348,822 | 9/1994 | Ovshinsky et al. | 429/223 |
| 5,384,210 | 1/1995 | Furukawa | 429/223 |

FOREIGN PATENT DOCUMENTS

| | | | |
|---|---|---|---|
| A20284333 | 9/1988 | European Pat. Off. | H01M 10/34 |
| B10293660 | 6/1993 | European Pat. Off. | H01M 4/38 |
| A10586718 | 3/1994 | European Pat. Off. | H01M 10/34 |

OTHER PUBLICATIONS

Patent Abstracts of Japan, unexamined applications, E field, vol. 16, No. 271, Jun. 18, 1992, The Patent Office Japanese Government, p. 152 E 1218; & JP A 04065 067 (Matsushita Electric Ind. Co. Ltd.) *abstract.

Chemical Abstracts, vol. 120, No. 8, Feb. 21, 1994, Columbus, Ohio, USA; Iwaki Tsu Tomu et al., "Forming of Sealed Nickel/Hydrogen Batteries" p. 295, No. 81 617c; & JP A 05 275 082 *absract.

Primary Examiner—Stephen Kalafut
Assistant Examiner—Carol Chaney
Attorney, Agent, or Firm—Sughrue, Mion, Zinn, Macpeak & Seas, PLLC

[57] ABSTRACT

In a method according to the present invention for manufacturing a nickel-metal-hydride battery, a positive electrode including nickel hydroxide, a negative electrode including a hydrogen occlusion alloy, and a separator are assembled, and the assembled components are placed in a battery vessel. The battery vessel is filled with an alkali electrolyte, and the vessel is sealed so as to produce a sealed nickel-metal-hydride battery. Thereafter, a formation step including at least one charging/discharging cycle of the nickel-metal-hydride battery is carried out, and after the formation step, the nickel-metal-hydride battery is charged. After the charging, the nickel-metal-hydride battery is left in a charged state for from one day until a time when there is no discharge capacity due to self-discharge.

20 Claims, 3 Drawing Sheets

METHOD FOR MANUFACTURING NICKEL-METAL-HYDRIDE BATTERY

BACKGROUND OF THE INVENTION

1. Field of the invention

The present invention relates to a method for manufacturing a nickel-metal-hydride battery having a positive electrode containing a nickel hydroxide as a main active material, a negative electrode containing a hydrogen occlusion alloy as a main material, a separator, an alkali electrolyte, and a battery vessel.

2. Description of the Related Art

A nickel-metal-hydride battery having a positive electrode containing a nickel hydroxide as a main active material, a negative electrode containing a hydrogen occlusion alloy as a main material, a separator, an alkali electrolyte, and a battery vessel has a higher energy density than a nickel-cadmium battery. In addition, a nickel-metal-hydride battery does not use cadmium as a negative active material, so it is better for the environment. Therefore, nickel-metal-hydride batteries have been preferably used as a power supply for portable instruments and electric automobiles recently.

Parts similar to those of a nickel-cadmium battery have been used as the positive electrode, the separator, the electrolyte and the battery vessel of a nickel-metal-hydride battery.

Intermetallic compounds of the $AB_5$ and $AB_2$ types are used as the hydrogen occlusion alloy of the negative electrode. In the $AB_5$ type compound, various metals have been partially substituted for La and Ni of the intermetallic compound $LaNi_5$ having a crystal structure of a $CaCu_5$ type so as to optimize the discharge capacity, the charge/discharge cycle life, the high-efficiency discharge characteristic and so on (U.S. Pat. No. 5,284,619). On the other hand, the $AB_2$ type is a Laves-phase intermetallic compound having a crystal structure of a C14 type ($MgZn_2$ type) or a C15 type ($MgCu_2$ type). Also, in this hydrogen occlusion alloy, a plurality of metal elements have been used for the A and B sites so as to optimize the discharge capacity, the charge/discharge cycle life, and so on (U.S. Pat. No. 4,551,400 to K. Sapru, et al., or European Patent No. 293660B1 to T. Gamo, et al.).

In such a nickel-metal-hydride battery, there have been two serious problems.

First, if the battery is discharged, for example, with a large current of about 1C mA at a low temperature such as −20° C. at an early time in the charge/discharge cycle, the discharge capacity is remarkably reduced in comparison with the case of discharge at room temperature, and in an extreme case it becomes difficult to obtain the discharge capacity. On the other hand, if the discharge is performed with a small current of about C/5mA, there is no problem, because the value of the discharge capacity at a temperature of −20 ° C. is about 90% of the value at 20 ° C. In a case where the operation of charge and discharge of a nickel-hydrogen battery is repeated, for example, about 100 times, even if the discharge is carried out at −20° C. with a current of 1CmA, it is possible to effect a discharge of about 60% of the discharge capacity at 20° C. with the same current. However, this method is not preferable, because a number of steps are required to carry out the discharge with a large current at a low temperature, thereby making it expensive to manufacture the battery.

Second, the self-discharge speed of the nickel-metal-hydride battery is equal to or larger than that of a nickel-cadmium battery.

It is known that the self-discharge of the nickel-cadmium battery is mainly caused by a "nitrate-nitrite shuttle" mechanism due to nitric radicals derived from a raw material salt and being residual as impurities in a positive active material or a negative active material, or decomposition products of a polyamide separator. As for the nickel-metal-hydride battery, in the case where a sintered nickel hydroxide electrode produced by the use of a solution containing a nickel nitrate is used as a positive electrode, the battery is charged in an open system after the battery is assembled, and the battery is preserved at a temperature of 30° to 60° C. so as to eliminate nitric ions (Published Japanese Patent Unexamined Application No. Hei. 4-322071). However, in this method, while the battery is preserved after being charged in an open system, an alkali electrolyte absorbs nitric radicals in the air so that the electrolyte is polluted, or water in the alkali electrolyte is evaporated so that the density or quantity of the electrolyte is changed. In addition, in the nickel-metal-hydride battery, there is a problem that the self-discharge speed is high even if a raw material salt of the positive active material does not contain nitric radicals and a polyamide separator is not used. This problem cannot be solved by the method disclosed in Published Japanese Patent Application No. Hei-4-322071.

In order to solve the first problem or another kind of problem, the conditions involved in the formation of a nickel-metal-hydride battery have been considered. The formation conditions for a nickel-metal-hydride battery can be classified roughly into the conditions of the first charge, the conditions of the first discharge, and the leaving of the battery as it is after charging and discharging the battery, and these conditions have been considered respectively.

Specifically, as the result of considering the conditions of the first charge, there have been proposed: means for performing the first charge perfectly under an atmosphere having a temperature which is lower than room temperature in order to improve the rapid charge characteristic (Published Japanese Patent Application No. Hei-3-22365); means for performing formation consisting of only the first charge in order to accelerate the initial activation of an $AB_2$ Laves-phase alloy (Published Japanese Patent Application No. Hei-3-241673); means for performing the charging at a low temperature of −20° C. to 20° C. in order to improve the high-efficiency discharge characteristic and the overcharge characteristic (Published Japanese Patent Application No. Hei-4-62763); means for stopping the charging or reducing the value of a charging current at least once during the charging in order to improve the charge efficiency and activation of a negative electrode and to improve the charge/discharge cycle life (Published Japanese Patent Application No. Hei-5-21092); means for performing the first charge after performing a process of charging of not more than 100% of the rated capacity in order to reduce the internal pressure in the process of the first charge and to reduce the number of charge/discharge cycles for initial activation (Published Japanese Patent Application No. Hei-5-174869); means for performing the first charge at a high temperature of 50° C. to 70° C. in order to increase the discharge capacity of a negative electrode of a nickel-hydrogen battery containing an $AB_2$ alloy based on Zr(Ti)-Ni in its negative electrode at the beginning of practical use (Published Japanese Patent Application No. Hei-5-275082); means for setting the time for leaving the battery as it is to be not longer than 14 hours after injecting electrolyte before starting the first charge, discontinuing the first charge for at least one hour at the time of charging not less than 5% and less than 100% of the rated capacity of the battery, and thereafter restarting the first charge in order to reduce the internal pressure at the time of overcharge of the battery to a low value (Published Japanese Patent Application No. Hei-6-45003); and means having a preservation process for formation, in which the battery is preserved at a higher temperature than room temperature in the condition of the first charge so as to make a self-discharge in order to accelerate the activation of the hydrogen occlusion alloy of a negative electrode to thereby obtain a high discharge capacity (Published Japanese Patent Application No. Hei-6-44490, and Published Japanese Patent Application No. Hei-2-301971).

On the other hand, as the result of considering the conditions of charge and discharge in the process of formation, there have been disclosed: means for making positive and negative electrodes hold a quantity of charge which is not less than 50% of the possible capacity of charge in the positive electrode, and performing discharge under an atmosphere having a temperature of 30° to 80° C. in order to improve the discharge characteristic such as low-temperature discharge, high-efficiency discharge, or the like (Published Japanese Patent Application No. Hei-4-61756); means for performing formation by charging at a low temperature and discharging at a high temperature, particularly in order to accelerate the initial activation of an alloy including an $AB_2$ Laves phase based on Zr-Ni (Published Japanese Patent Application No. Hei-4-65067); means for performing discharging at least once before or during charging in order to improve the charge efficiency of the hydrogen occlusion alloy to thereby restrain the operation of a safety valve, and to improve the charge/discharge cycle life (Published Japanese Patent Application No. Hei-4-67576); means for performing charging for one or more hours under an atmosphere having a temperature of 30° to 80° C. in the state where the battery voltage is not higher than 1V and not lower than 0V in order to improve the discharge characteristic such as low-temperature discharge, high-efficiency discharge or the like (Published Japanese Patent Application No. Hei-4-126370); and means for stopping the discharge or reducing the value of a discharging current at least once during the discharge in the charge/discharge cycle, and thereafter passing the discharge current or increasing the discharge current again in order to improve the discharge efficiency, and hence the activation, of the battery, and to improve the cycle life (Published Japanese Patent Application No. Hei-5-182695).

In addition, there has been disclosed means for maintaining the battery for a predetermined time in the discharged state at a temperature of about 30° to 60° C. after performing at least one charge and discharge in order to increase the discharge capacity in a high-efficiency discharge of not less than 1 CmA from the beginning (Published Japanese Patent Application No. Hei-5-3033981, and EP No. 586718A1).

In these means, however, there have been disadvantages that it is troublesome to change the temperature of charge and discharge, or it is difficult to obtain the effect of improving the self-discharge characteristic at the same time.

SUMMARY OF THE INVENTION

It is an object of the present invention to provide a method for manufacturing a nickel-metal-hydride battery in which a large discharge capacity can be obtained in an early time in the charge/discharge cycle and in which the self-discharge can be restrained conspicuously even if discharge is performed with a large current at a low temperature, and which is not troublesome.

According to the present invention, the method for manufacturing a nickel-metal-hydride battery includes: assembling and sealing a nickel-metal-hydride battery comprising a positive electrode including a nickel hydroxide, a negative electrode including a hydrogen occlusion alloy, a separator, an alkali electrolyte, and a battery vessel; a formation step comprising at least one charging/discharging of the nickel-metal-hydride battery; after the formation step, charging the nickel-metal-hydride battery; and after the charging step, leaving the nickel-metal-hydride battery.

The nickel-metal-hydride battery manufactured by the method according to the present invention has a large discharge capacity in an early time in the charge/discharge cycle and a self-distance even if discharge is performed with a large current at a low temperature.

DETAILED DESCRIPTION OF THE INVENTION

Figure 1:
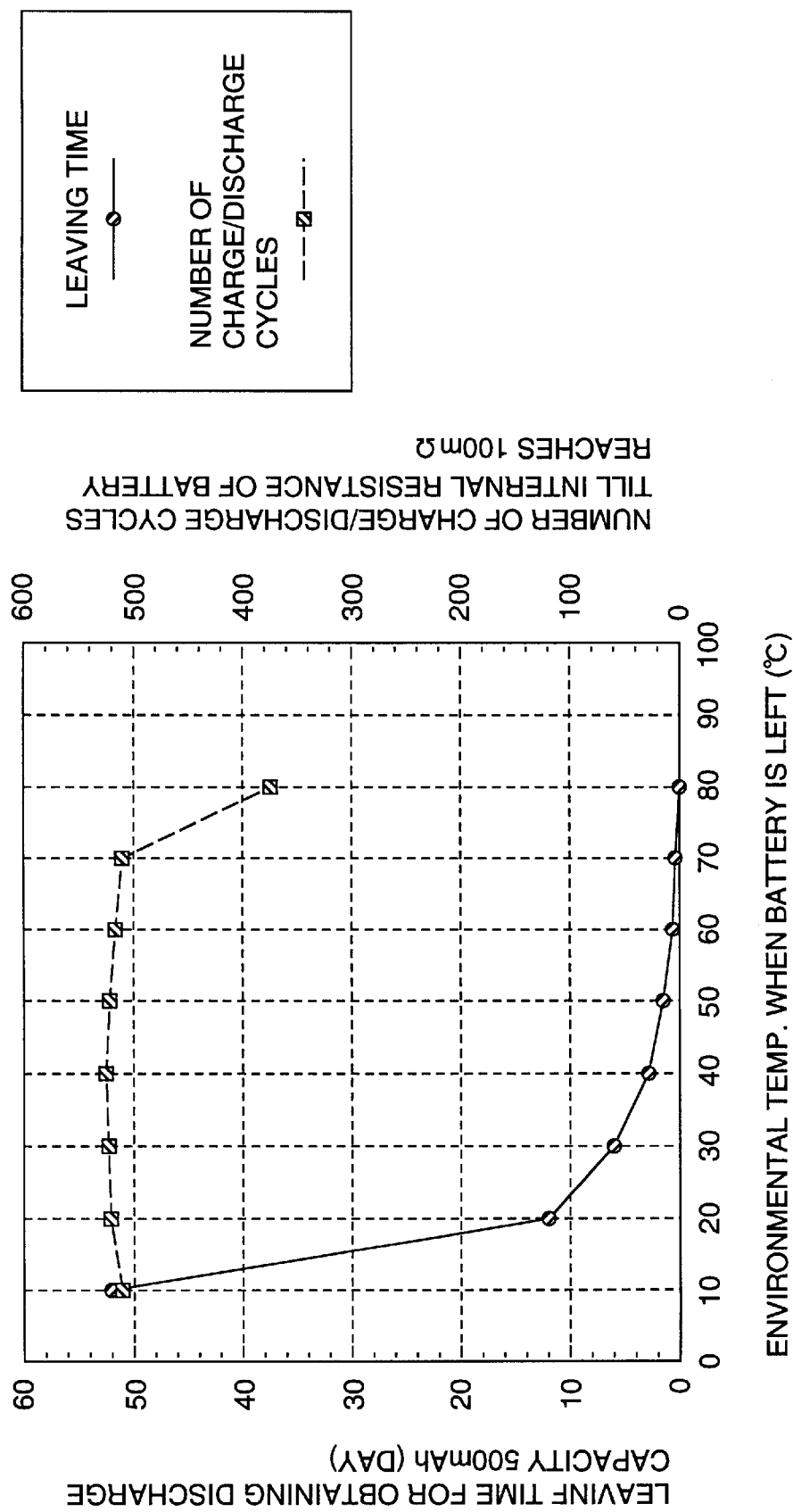
FIG. 1 is a diagram showing the relationship among: the time for leaving a nickel-metal-hydride battery for obtaining a discharge capacity of 500 mAh in the case of discharge with a large current of 1 CmA at −20° C. in the nickel-metal-hydride battery left as it is at various temperatures after charging the battery after formation consisting of at least one time of charge and discharge after the battery is assembled and sealed; the number of charge/discharge cycles until the internal resistance of the nickel-metal-hydride battery reaches 100 MΩ; and the environmental temperature when the battery is left as it is.

The detailed description of the present invention will refer to the accompanying drawings.

In the present invention, a nickel-metal-hydride battery having a positive electrode containing a nickel hydroxide as a main active material, a negative electrode containing a hydrogen occlusion alloy as a main material, a separator, an alkali electrolyte, and a battery vessel is assembled and sealed.

In particular, in the present invention, a positive electrode including a nickel hydroxide as a main active material, a negative electrode including a hydrogen occlusion alloy as a main material and a separator is assembled in a battery vessel, and the battery vessel is filled with an alkali electrolyte. Thereafter, the battery vessel is sealed to manufacture a battery. Next, the battery is subjected to a formation step including at least one cycle of charge and discharge, and then, the battery is left as it is after the battery is charged so as to manufacture a nickel-metal-hydride battery. Consequently, a large discharge capacity can be obtained in an early time in the charge/discharge cycle even when the discharge is performed with a large current of, for example, about 1 CmA and at a low temperature of, for example, −20° C. At the same time, the self-discharge speed is reduced. Moreover, it is unnecessary to change temperatures during charge and discharge, and the battery's electrolyte does not contact with the atmosphere.

Such operations and effects given by the means of the present invention for leaving a battery as it is in the charged state after formation consisting of at least one time of charge and discharge are much larger than those given by the means for leaving a battery as it is in the discharged state after the formation (Published Japanese Patent Application No. Hei-5-3033981, and EP No. 586718A1).

The following is a reason why different operations/effects may be caused depending on the difference in the charged state of a battery to be left as it is. That is, when a nickel-metal-hydride battery is discharged with a large current at a low temperature, the discharge of a hydrogen occlusion alloy of a negative electrode is difficult under such a condition, and the discharge capacity is reduced conspicuously. However, when the nickel-metal-hydride battery manufactured in the method of the present invention is discharged with a large current at a low temperature, the discharge capacity is restrained from decreasing because a hydrogen occlusion alloy of a negative electrode of the nickel-metal-hydride battery is discharged easily even in such a condition.

The reason why the capacity of the nickel-metal-hydride battery manufactured in the method of the present invention is hardly reduced even when a hydrogen occlusion alloy of a negative electrode is discharged with a large current at a low temperature may be considered as follows. That is, the quantity of metal-hydride (charge products) of the negative electrode is more than that of the battery which is in the discharged state in the case of the nickel-metal-hydride battery in the charged or overcharged state. Accordingly, the metal-hydride may be decomposed more easily than the hydrogen occlusion alloy when the metal-hydride contacts with the alkali electrolyte so that sites which are high in electrode catalytic activity may be easily formed in the surface of the hydrogen occlusion alloy.

In addition, when the conventional means for leaving a battery as it is in the charged state before formation consisting of at least one time of charge and discharge (Examined Japanese Patent Publication No. Hei-6-44490, and Published Japanese Patent Application No. Hei-2-301971) is adopted, in comparison with the means of the present invention for leaving a battery as it is in the charged state after formation consisting of at least one time of charge and discharge, the former is disadvantageous in that a very small internal short-circuit of a nickel-metal-hydride battery is apt to be produced.

The reason why the difference in operations/effects is caused by the difference of means may be considered as follows. Cadmium, zinc or cobalt used as an additive to a positive electrode does not yet enter crystals of a nickel hydroxide which is a main active material of the positive electrode before formation consisting of one time of charge and discharge, and a solid solution is not yet formed thoroughly. Accordingly, if the nickel-metal-hydride battery is left as it is in the charged state, cadmium, zinc or cobalt added to the positive electrode is electrodeposited in a metallic state on the negative electrode in the charged state in which the potential is base, so that there is a possibility that a very small partial short-circuit is caused by a very small dendrite of these metals. (The potential of a hydrogen occlusion alloy electrode in the charged state in an alkali electrolyte is lower than the reversible potential of cadmium and cobalt in the alkali electrolyte, while higher than the reversible potential of zinc, so that cadmium and cobalt can be deposited in a metallic state. Although zinc cannot be deposited as an element metal, its under potential deposition may be caused.)

It is preferable that the environmental temperature is not lower than 20° C. when a battery is left as it is after the battery is charged or overcharged after execution of formation consisting of at least one time of charge and discharge. Accordingly, the discharge capacity is restrained from decreasing with a large current under a low temperature, and the required time to leave the battery as it is can be reduced. If the environmental temperature is not higher than 70° C., it is possible to effectively restrain the charge/discharge cycle life from decreasing.

It is preferable that the battery is left for from one day to a time when there is no discharge capacity due to the self-discharge, more preferably, for from seven days to that time.

In addition, the operation of the present invention to restrain the discharge capacity from decreasing with a large current at a low temperature is more conspicuous if the charge electrical quantity of the battery before leaving the battery as it is after formation consisting of at least one time of charge and discharge is not less than 100% of the theoretical capacity in which a nickel hydroxide of the positive electrode obeys a one-electron reaction. If not more than 300%, it is also possible to effectively restrain the charge/discharge cycle life from decreasing.

In addition, the charge electrical quantity of the battery before leaving the battery as it is after formation including at least one time of charge and discharge is preferably in the range of 100% to 300% of the theoretical capacity in which a nickel hydroxide of the positive electrode obeys a one-electron reaction. Therefore, it is possible to conspicuously restrain the discharge capacity from decreasing with a large current at a low temperature, and to effectively restrain the charge/discharge cycle life from decreasing.

Further, in the method of the present invention for manufacturing the nickel-metal-hydride battery, it is preferably performed one or more times that the battery is discharged after the battery is left as it is for one day or more after the battery is charged. Accordingly, the self-discharge speed of the battery is reduced to improve the capacity holding characteristic every time when the step of discharging the battery after leaving the battery as it is after charging the battery is performed repeatedly.

In this case, it is preferable that the battery is left as it is for from one day to twenty days before the formation, more preferably from seven days to twenty days. If the battery is left for seven days or more, the great effect can be obtained. However, if the battery is left for more than twenty days, the effect corresponding to such a long leaving cannot be obtained. Accordingly, the self-discharge speed of the battery is reduced so as to accelerate improvement of the capacity holding characteristic.

In the present invention, since the leaving step after charging the battery is performed after assembling and sealing the battery, there is no pollution due to the electrolyte and no change with respect to the concentration and quantity of the electrolyte.

Incidentally, through the manufacturing method of the present invention, it is preferable that the environment temperature is in the range of 20° to 70° C.

The present invention will be described in detail with an example comparing with comparative examples through experimentation.

Experimentation 1

Positive electrodes were produced in the following manner.

That is, 95 weight % of positive active material powder including a nickel hydroxide obtained through the coprecipitation of hydroxides of nickel, cobalt and zinc with a weight ratio of 95:2:3 was mixed with 5 weight t of cobalt hydroxide powder. Water was added and mixed with this mixture to thereby prepare a paste. Cobalt hydroxide was an additive to improve the utilization factor of the active material of the positive active material, and to obtain the discharge reserve of a negative electrode. The same function can be obtained also by cobalt metal or cobalt oxide. Next, this paste was filled into a foamed nickel porous-body having an average pore size of about 300 $\mu$m, dried, pressed, and cut into a predetermined size to produce positive electrodes.

Negative electrodes were produced in the following manner.

That is, metal materials of a Misch metal (being referred hereinafter a 'Mm', and including about 45 weight % La, about 5 weight % Ce, about 10 weight % Pr, and about 40 weight % Nd), Ni, Co, Mn and Al were melted in a high-frequency induction furnace so as to have the composition of $MmNi_{3.6}Coo6Al_{0.4}Mn_{0.3}$, and put into a metal mold to solidify. The obtained ingot was powdered and put through a sieve so that hydrogen occlusion alloy powder of an average particle size of about 30 $\mu$m was obtained. Next, 100 parts by weight of this hydrogen occlusion alloy powder and 2 parts by weight of carbon black as a conductance assistant were mixed together with a water solution of polyvinyl alcohol having the function of a thickener and a bonding agent so as to prepare a paste. Next, this paste was applied onto a drilled steel made of iron plated with nickel and having a thickness of about 80 $\mu$m and an aperture rate of about 50%. The coated steel was dried, pressed and cut into a predetermined size so as to produce negative electrodes.

Three positive electrodes and four negative electrodes thus produced were laminated together through separators made of polyamide non-woven fabric, and put in an iron battery vessel plated with nickel. An alkali electrolyte obtained by dissolving LiOH in an amount 10 g/l into a KOH aqueous solution of 7 mol was poured into the battery vessel, and the battery was sealed with a cover having positive electrode terminals also functioning as safety valves, so that a square closed nickel-metal-hydride battery was produced. The size of this battery was 67 mm long, 16.4 mm wide, and 5.6 mm thick. When this battery was discharged at a temperature of 20° C. with a current of 180 mA, the discharge capacity was about 900 mAh, and the capacity limitation electrode of this discharge was the positive electrode. This discharge capacity corresponds to a 100% active material utilization rate on the assumption that the theoretical capacity is such that a nickel hydroxide contained in a positive electrode obeys a one-electron reaction. The charge and discharge of this battery were both limited by the capacity of the positive electrode.

Next, a plurality of nickel-metal-hydride batteries having the same configuration as this battery were prepared, and the steps leaving the battery as it is and/or formation including charge and/or discharge were performed under the following conditions.

Battery A (a battery according to the present invention to be left as it is in the charged state after formation):

Charge of formation for 8 hours (20° C.) with 180 mA. Thereafter, discharge of formation (20° C.) with 180 mA until the terminal voltage became 1.0V. Thereafter, charge for 8 hours (20° C.) with 180 mA. Thereafter, leaving the battery as it is for 7 days at 40° C.

Battery B (a comparative example to be left as it is in the state of the first charge of formation):

Charge of formation for 8 hours (20° C.) with 180 mA. Thereafter, leaving the battery for 7 days at 40° C. Thereafter, discharge of formation (20° C.) with 180 mA until the terminal voltage became 1.0V.

Battery C (a comparative example to be left as it is in the discharged state after one cycle of formation):

Charge of formation for 8 hours (20° C.) with 180 mA. Thereafter, discharge of formation (20° C.) with 180 mA until the terminal voltage became 1.0V. Thereafter, leaving the battery as it is for 7 days at 40° C.

Battery D (a comparative example to be left as it is in the discharged state after two cycles of formation):

Charge of formation for 8 hours (20° C.) with 180 mA. Thereafter, discharge of formation (20° C.) with 180 mA until the terminal voltage became 1.0V. Thereafter, again, charge of formation for 8 hours (20° C.) with 180 mA, and discharge of formation (20° C.) with 180 mA until the terminal voltage became 1.0V. Thereafter, leaving the battery as it is for 7 days at 40° C.

Battery E (a comparative example not to be left as it is, only with two cycles of formation):

Charge of formation for 8 hours (20° C.) with 180 mA. Thereafter, discharge of formation (20° C.) with 180 mA until the terminal voltage became 1.0V. Thereafter, again, charge of formation for 8 hours (20° C.) with 180 mA, and discharge of formation (20° C.) with 180 mA until the terminal voltage became 1.0V.

The following examination was given to the batteries A, B, C, D and E. These batteries were charged with a current of 900 mA for 66 minutes. Since the battery A according to the present invention had been left as it was in the charged state, the battery A was once discharged (20° C.) with a current of 180 mA until the terminal voltage became 1.0V after leaving the battery as it was, and thereafter charged with a current of 900 mA for 66 minutes in order to make the conditions of charge the same as those of the comparative batteries, which were to be examined after the batteries were discharged. In the battery according to the present invention, even if this battery was not discharged but only charged so as to compensate for the capacity reduced by the self-discharge during the leaving of the battery as it was in the charged state, the same experimental result as follows could be obtained.

Next, these batteries A, B, C, D and E in the charged state were put in a constant temperature oven of –20° C., and their discharge capacities were measured with a current of 900 mA (about 1 hour rate) until the terminal voltage reached 1.0V. Table 1 shows the results.

TABLE 1

| Battery | Discharge capacity (900 mA, –20° C.) (mAh) |
|---------|--------------------------------------------|
| A       | 550                                        |
| B       | 100                                        |
| C       | 50                                         |
| D       | 60                                         |
| E       | 30                                         |

It is understood from Table 1 that the battery A manufactured in the method of the present invention has an effect to conspicuously restrain the discharge capacity from decreasing in the case of discharging with a large current at a low temperature, in comparison with the batteries B, C, D and E manufactured in the conventional methods.

On the other hand, it is understood that the discharge capacity was hardly obtained in the batteries C and D, which were comparative examples and which were left as they were in the discharged state, and the discharge capacity was no more than that of the battery E, which was a comparative example and which was not left as it was after formation.
Experimentation 2

Batteries A, B, C, D and E manufactured in the same methods as those in Experimentation 1 were charged with a current of 900 mA at 20° C. for 66 minutes. Since the battery A according to the present invention had been left as it was in the charged state, the battery A was once discharged (20° C.) with a current of 180 mA until 1.0V after leaving the battery as it was, and thereafter charged with a current of 900 mA for 66 minutes in order to make the conditions of charge the same as those of the comparative batteries, which were to be examined after the batteries were discharged. In the battery according to the present invention, even if this battery was not discharged but only charged so as to compensate for the capacity reduced by the self-discharge during the leaving of the battery as it was in the charged state, the same experimental result as follows could be obtained.

The self-discharge characteristics were examined in the following manner.

That is, these batteries A, B, C, D and E in the charged state were discharged with a current of 180 mA at 20° C. until the terminal voltage reached 1.0V, and their discharge capacities were measured.

Next, after these batteries A, B, C, D and E were charged with a current of 900 mA at 20° C. for 66 minutes again, the batteries were left as they were for 7 days in a constant temperature oven. After that, the batteries were discharged with a current of 180 mA at 20° C. until the terminal voltage reached 1.0V, and their residual discharge capacities were measured after leaving them as they were.

The residual discharge capacity after leaving is divided by the residual discharge capacity before leaving so as to obtain the capacity holding rate. Table 2 shows the results.

TABLE 2

| Battery | Capacity holding rate after leaving for seven days at 40° C. (%) |
|---|---|
| A | 65 |
| B | 8 |
| C | 53 |
| D | 54 |
| E | 52 |

The following is understood from Table 2. That is, the battery A manufactured in the method of the present invention has an extremely high capacity holding rate, and its self-discharge is restrained effectively, in comparison with the batteries B, C, D and E manufactured in the conventional methods.

In Table 2, the capacity holding rate of the battery B is extremely small. Battery B was taken apart in order to see the reason for the extremely small capacity holding rate. Its separator had gotten dirty and black, and it was guessed that a very small internal short-circuit of the battery occurred.

Accordingly, in the nickel-metal-hydride battery manufactured in the method of the present invention, it is apparent from Experiment 1 and Experiment 2 that the capacity can be effectively restrained from decreasing in the case of discharging with a large current at a low temperature, and the self-discharge can be restrained effectively. Such conspicuous operation/effect cannot be obtained by any conventional battery.
Experimentation 3

Nickel-metal-hydride batteries were manufactured in the same method as that of the battery A according to the present invention in Experimentation 1, except for changing the time and temperature of leaving the batteries as they were after execution of the charge of formation consisting of one time of charge and discharge. Batteries F, G, H, I, J, K, L and M were manufactured while setting the temperature of the step of leaving the batteries as they were after the charge to 10° C., 20° C., 30° C., 40° C., 50° C., 60° C., 70° C., and 80° C., respectively. Their discharge capacities with a current of 900 mA at −20° C. were measured by the same method as that in Experiment 1, and the time for leaving the batteries as they were after the charge and discharge of formation necessary for the discharge capacities to reach 500 mAh was investigated. In addition, the time for leaving the batteries as they were at each temperature after discharge of formation consisting of one time of charge and discharge was regarded as the necessary time for the discharge capacity to reach 500 mA. By use of the nickel-metal-hydride batteries manufactured in the same method as that of the battery A according to the present invention in Experiment 1 except for the above point, charge/discharge cycle tests were performed under the condition where the batteries were charged with a current of 900 mA at a surrounding temperature of 20° C. for 66 minutes, and discharged with a current of 900 mA until the terminal voltage reached 1.0V. In a nickel-metal-hydride battery, as charge/discharge cycles advance, water is consumed with the corrosion of a hydrogen occlusion alloy, or an electrolyte is absorbed in a positive electrode to thereby exhaust the electrolyte for a separator, so that the internal resistance of the battery is increased. This is the cause of the charge/discharge cycle life of the battery. Therefore, in these charge/discharge cycle tests, the charge/discharge cycles until the internal resistance of each battery reached 100 mΩ (10 to 20 mΩ at the beginning of the charge/discharge cycles) were measured.

FIG. 1 shows the time for leaving the battery as it is after charge after formation necessary for obtaining the discharge capacity of 500 mAh in the case of discharge with a large current at a low temperature, and the number of charge/discharge cycles until the internal resistance reached 100 mΩ, which were obtained as the results of these tests.

It is apparent from FIG. 1 that it is possible to obtain two effects at the same time; that is, if the environmental temperature is not lower than 20° C. when the battery is left as it is after the battery is charged or overcharged after execution of formation consisting of at least one time of charge and discharge, it is possible to reduce the time for leaving the battery as it is necessary for restraining the discharge capacity from decreasing with a large current and at a low temperature, and if the environmental temperature is not higher than 20° C., it is possible to effectively restrain the charge/discharge cycle life from decreasing.
Experimentation 4

Nickel-metal-hydride batteries were manufactured in the same method as that of the battery A according to the present invention in Experimentation 1, excepting that the charge electrical quantity before leaving the batteries as they were after formation consisting of one time of charge and discharge was changed within a range of 50% to 3,000% of its theoretical capacity in which a nickel hydroxide of a positive electrode obeys a one-electron reaction. The discharge capacities of the batteries with a current of 900 mA at −20° C. were measured in the same manner as that in Experiment 1.

By use of these nickel-metal-hydride batteries, charge/discharge cycle tests were performed under the condition where the batteries were charged with a current of 900 mA at a surrounding temperature of 20° C. for 66 minutes, and discharged with a current of 900 mA until the terminal voltage reached 1.0V. In the nickel-metal-hydride battery, as charge/discharge cycles advance, water is consumed with the corrosion of a hydrogen occlusion alloy, or an electrolyte is absorbed into a positive electrode to thereby exhaust the electrolyte for a separator, so that the internal resistance of the battery is increased. This is the cause of the charge/discharge cycle life of the battery. Therefore, in these charge/discharge cycle tests, the number of charge/discharge cycles until the internal resistance of each battery reached 100 mΩ (10 to 20 mΩ at the beginning of the charge/discharge cycles) was also measured. Table 3 shows the results.

TABLE 3

| Charge Electrical Quantity | 50 | 100 | 150 | 200 | 250 | 300 | 350 | 1000 | 3000 |
|---|---|---|---|---|---|---|---|---|---|
| Discharge Capacity at −20° C. (mAh) | 320 | 550 | 560 | 565 | 568 | 570 | 572 | 573 | 574 |
| The number of charge/discharge cycles until internal resistance of each battery reached 100 mΩ | 520 | 525 | 527 | 529 | 528 | 527 | 519 | 483 | 372 |

The following is understood from Table 3. That is, although the value 320 mAh was obtained as the discharge capacity at the time of discharge with a large current at −20° C. even if the charge electrical quantity before leaving the battery as it was 50% of the theoretical capacity in which a nickel hydroxide of a positive electrode obeys a one-electron reaction, the discharge capacity was especially large at not less than 100% of the theoretical capacity. If the charge electrical quantity before leaving the battery as it was beyond 300% of the theoretical capacity in which a nickel hydroxide of a positive electrode obeys a one-electron reaction, the number of charge/discharge cycles until the internal resistance reached 100 mΩ began decreasing conspicuously. It is supposed that the reason why the charge/discharge cycle life becomes shorter when the charge electrical quantity becomes larger is that the quantity of a nickel λ-oxyhydroxide having a large mol volume increases in charge products of a positive electrode, so as to accelerate the swelling of the positive electrode so that an electrolyte in a separator is absorbed into the positive electrode.

It is therefore understood that the preferred range where the discharge capacity is large in the case of discharge with a large current at −20° C., and where the charge/discharge cycle life does not decrease conspicuously, is such that the charge electrical quantity after formation consisting of one time of charge and discharge is not less than 100% and not more than 300% of the theoretical capacity in which a nickel hydroxide of a positive electrode obeys a one-electron reaction.

Experimentation 5

A nickel-metal-hydride battery was manufactured in the same methods as those in Experiment 1.

This battery was subjected to formation consisting of several times of charge and discharge at a temperature of 20° C. After the formation, a process consisting of charge-leaving-discharge was performed. One cycle of this process had the following conditions.

That is, the above nickel-metal-hydride battery was left as it was for 7 days in a constant temperature oven at a temperature of 40° C. after the battery was charged for 66 minutes with a current of 900 mA at a temperature of 20° C. Thereafter, the battery was discharged with a current of 180 mA at a temperature of 20° C. until the terminal voltage reached 1.0V.

After this process consisting of charge-stand-discharge was performed, the self-discharge speed, that is, the capacity holding characteristic was examined under the following conditions.

After the above nickel-metal-hydride battery was charged for 66 minutes with a current of 900 mA at a temperature of 20° C., the battery was discharged with a current of 180 mA at a temperature of 20° C. until the terminal voltage reached 1.0V. Then, the discharge capacity before the self-discharge was examined. After that, the battery was left as it was for 7 days in a constant temperature oven at a temperature of 40° C. after the battery was charged for 66 minutes with a current of 900 mA at a temperature of 20° C. Thereafter, the battery was discharged with a current of 180 mA at a temperature of 20° C. until the terminal voltage reached 1.0V. Then, the residual discharge capacity was examined. The capacity holding rate was calculated from the ratio of this residual discharge capacity to the discharge capacity before the self-discharge.

Figure 2:
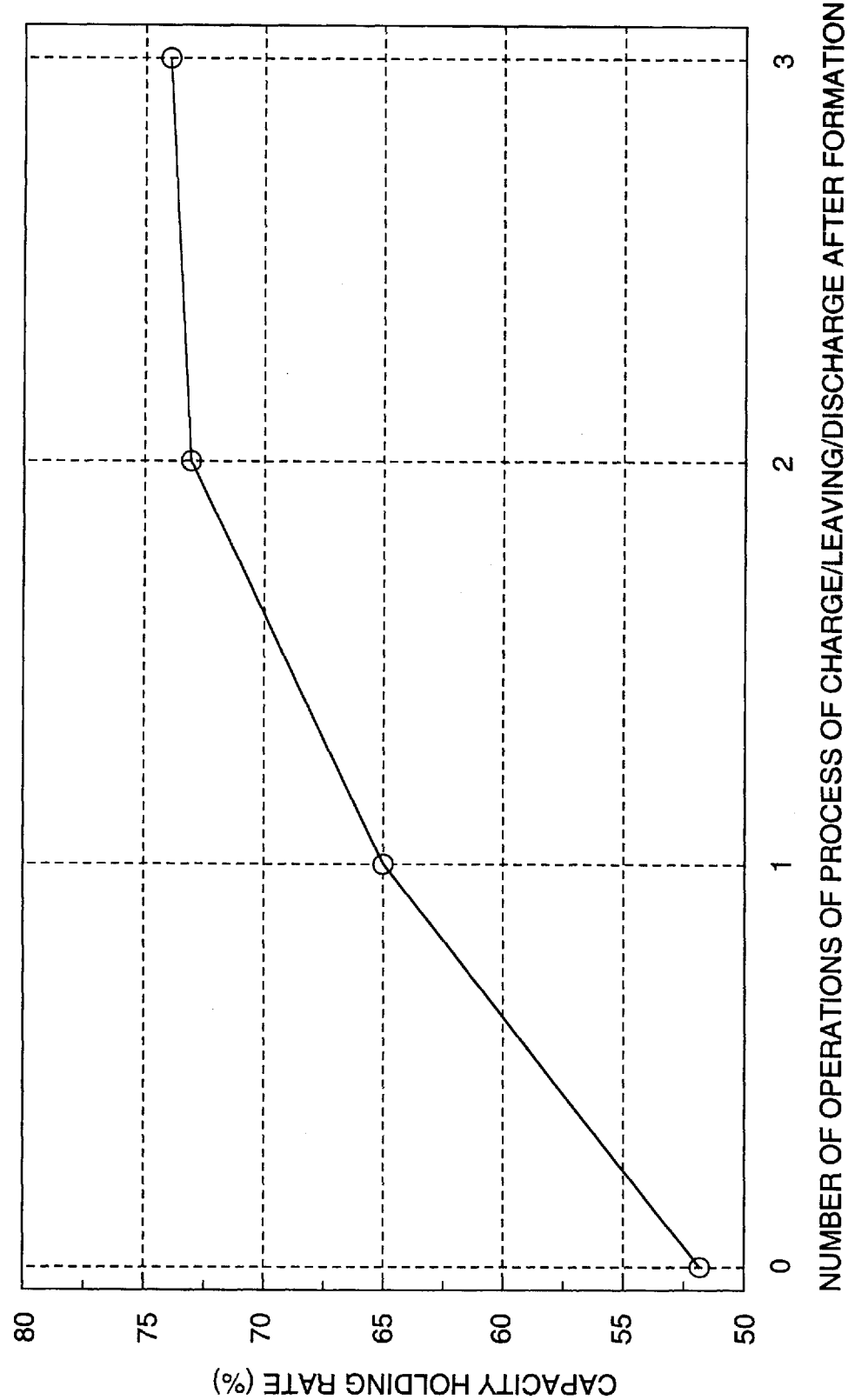
FIG. 2 is a diagram showing the relationship between the capacity holding rate of the nickel-metal-hydride battery and the number of operations of the process to discharge the battery after leaving the battery as it is for one or more days after charging the battery after the formation.

FIG. 2 shows the relationship between the capacity holding rate thus obtained and the number of cycles of the process consisting of charge-stand-discharge. In FIG. 2, the number of cycles of the process "0" expresses the result of the capacity holding characteristic examined without any process consisting of charge-stand-discharge after the formation. It is apparent from FIG. 2 that the capacity holding rate increases to reduce the self-discharge speed as the number of cycles of the process consisting of charge-stand-discharge after the formation increases.

Experimentation 6

A nickel-metal-hydride battery was produced in the same manner as in Experimentation 5 excepting the part after the formation consisting of charge and discharge.

Next, before the formation consisting of charge and discharge, the battery was left as it was for a variety of times at a temperature of 40° C., and after the formation consisting of charge and discharge, the battery was left as it was for 7 days in a constant temperature oven at a temperature of 40° C. after the battery was charged for 66 minutes with a current of 900 mA at a temperature of 20° C.

After that, in order to examine the self-discharge, this battery was discharged with a current of 180 mA at a temperature of 20° C. until the terminal voltage reached 1.0V. After that, the self-discharge speed, that is, the capacity holding characteristic was examined under the following conditions.

That is, after the above nickel-metal-hydride battery was charged for 66 minutes with a current of 900 mA at a temperature of 20° C., the battery was discharged with a current of 180 mA at a temperature of 20° C. until the terminal voltage reached 1.0V. Then, the discharge capacity before the self-discharge was examined. After that, the battery was left as it was for 7 days in a constant temperature oven at a temperature of 40° C. after the battery was charged with a current of 900 mA for 66 minutes at a temperature of 20° C. Thereafter, the battery was discharged with a current of 180 mA at a temperature of 20° C. until the terminal voltage reached 1.0V. Then, the residual discharge capacity was examined. The capacity holding rate was calculated from the ratio of this residual discharge capacity to the discharge capacity before the self-discharge.

Figure 3:
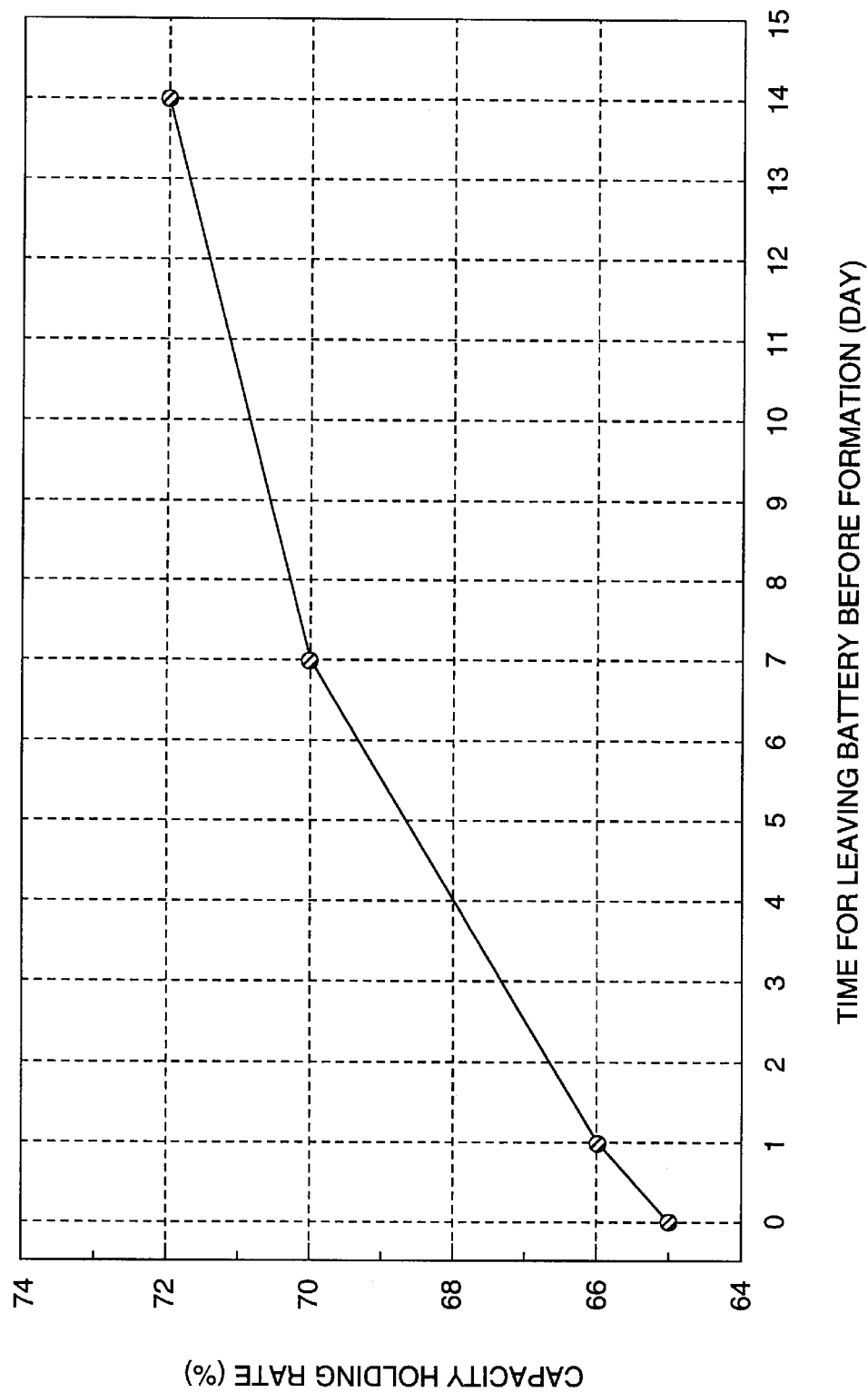
FIG. 3 is a diagram showing the relationship between the capacity holding rate of a nickel-metal-hydride battery and the time to leave the battery as it is before the formation consisting of at least one cycle of charge and discharge in a method of producing a nickel-metal-hydride battery having a step of leaving the battery as it is for one or more days after charging the battery after the formation after sealing the battery.

FIG. 3 shows the relationship between the amount of time that the battery was left as it was before the formation and the capacity holding rate in this experiment. It is apparent from FIG. 3 that the capacity holding rate becomes large when the amount of time that the battery is left as it is before the formation is not less than one day.

In FIG. 3, the time "0" to leave the battery as it is before the formation corresponds to the number of cycles "1" of the process consisting of charge-stand-discharge after the formation in Experimentation 5. In this Experiment, however, the "discharge" in the process of "charge-stand-discharge" is not a necessary condition, but an operation/effect similar to that in FIG. 3 can be obtained even if this "discharge" is not performed. In this Experiment, the battery was once discharged, since the charging conditions in the measurement of the capacity holding rate had to be fixed.

Although the kind of hydrogen occlusion alloy of a negative electrode, the method of producing alloy powder, the method of producing the negative electrode, the method of blending or producing the positive electrode mixture, the composition of the electrolyte, the configuration, shape and size of the nickel-metal-hydride battery, the number of charge/discharge cycles of the formation, the temperature, the time, the electric current, and other conditions/configurations were described in detail by use of special configurations in the above embodiment, those who have common technical knowledge in this technical field may modify and change them within the scope of the present invention, and such modifications and changes are included in the scope of the present invention.

What is claimed is:

1. A method for manufacturing a nickel-metal-hydride battery comprising the steps of: assembling and sealing a nickel-metal-hydride battery comprising a positive electrode including a nickel hydroxide, a negative electrode including a hydrogen occlusion alloy, a separator, an alkali electrolyte, and a battery vessel;

a formation step comprising at least one charging/discharging of said nickel-metal-hydride battery;

after said formation step, charging said nickel-metal-hydride battery;

after said charging step, leaving said nickel-metal-hydride battery in a charged state for from one day until a time when the battery can no longer self-discharge;

after said leaving step, charging said nickel-metal-hydride battery; and after said charging step after said leaving step, at least one charge/leaving/discharging step;

further comprising the step of, before said formation step, leaving said nickel-metal-hydride battery for in a range of seven days to twenty days.

2. A method according to claim 1, wherein said leaving step is performed at a temperature in a range of 20° C. to 70° C.

3. A method according to claim 1, wherein, in said charging step, the battery is charged to 100% to 300% of the theoretical capacity in which a nickel hydroxide is obtained by reduction of nickel oxyhydroxide at a positive electrode with acceptance of an electron.

4. A method according to claim 2, wherein, in said charging step, the battery is charged to 100% to 300% of the theoretical capacity in which a nickel hydroxide is obtained by reduction of nickel oxyhydroxide at a positive electrode with acceptance of an electron.

5. A method according to claim 1, wherein said charging step after said formation step is performed for one day or more.

6. A method according to claim 5, wherein said charging step after said formation step is performed for seven days or more.

7. A method according to claim 5, wherein said leaving step is performed at a temperature in a range of 20° C. to 70° C.

8. A method according to claim 6, wherein said leaving step is performed at a temperature in a range of 20° C. to 70° C.

9. A method according to claim 1, wherein said positive electrode comprises a positive active material including a nickel hydroxide obtained through the coprecipitation of hydroxides of nickel, cobalt and zinc, and at least one of metal cobalt, cobalt hydroxide and cobalt oxide.

10. A method according to claim 1, wherein said positive electrode comprises a negative active material including Ni, Co, Mn, Al and a Misch metal including La, Ce, Pr and Nd.

11. A method for manufacturing a nickel-metal-hydride battery comprising the steps of: assembling and sealing a nickel-metal-hydride battery comprising a positive electrode including a nickel hydroxide, a negative electrode including a hydrogen occlusion alloy, a separator, an alkali electrolyte, and a battery vessel;

a formation step comprising at least one charging/discharging of said nickel-metal-hydride battery;

after said formation step, charging said nickel-metal-hydride battery;

after said charging step, leaving said nickel-metal-hydride battery in a charged state for from one day until a time when the battery can no longer self-discharge;

further comprising the step of, before said formation step, leaving said nickel-metal-hydride battery for in a range of seven days to twenty days.

12. A method according to claim 11, wherein said leaving step is performed at a temperature in a range of 20° C. to 70° C.

13. A method according to claim 11, wherein, in said charging step, the battery is charged to 100% to 300% of the theoretical capacity in which a nickel hydroxide is obtained by reduction of nickel oxyhydroxide at a positive electrode with acceptance of an electron.

14. A method according to claim 12, wherein, in said charging step, the battery is charged to 100% to 300% of the theoretical capacity in which a nickel hydroxide is obtained by reduction of nickel oxyhydroxide at a positive electrode with acceptance of an electron.

15. A method according to claim 11, wherein said charging step after said formation step is performed for one day or more.

16. A method according to claim 15, wherein said charging step after said formation step is performed for seven days or more.

17. A method according to claim 15, wherein said leaving step is performed at a temperature in a range of 20° C. to 70° C.

18. A method according to claim 16, wherein said leaving step is performed at a temperature in a range of 20° C. to 70° C.

19. A method according to claim 11, wherein said positive electrode comprises a positive active material including a nickel hydroxide obtained through the coprecipitation of hydroxides of nickel, cobalt and zinc, and at least one of metal cobalt, cobalt hydroxide and cobalt oxide.

20. A method according to claim 11, wherein said positive electrode comprises a negative active material including Ni, Co, Mn, Al and a Misch metal including La, Ce, Pr and Nd.

* * * * *